Feb. 21, 1933.      C. J. DUNZWEILER      1,898,718
VENT PLUG FOR STORAGE BATTERIES
Filed Aug. 15, 1928
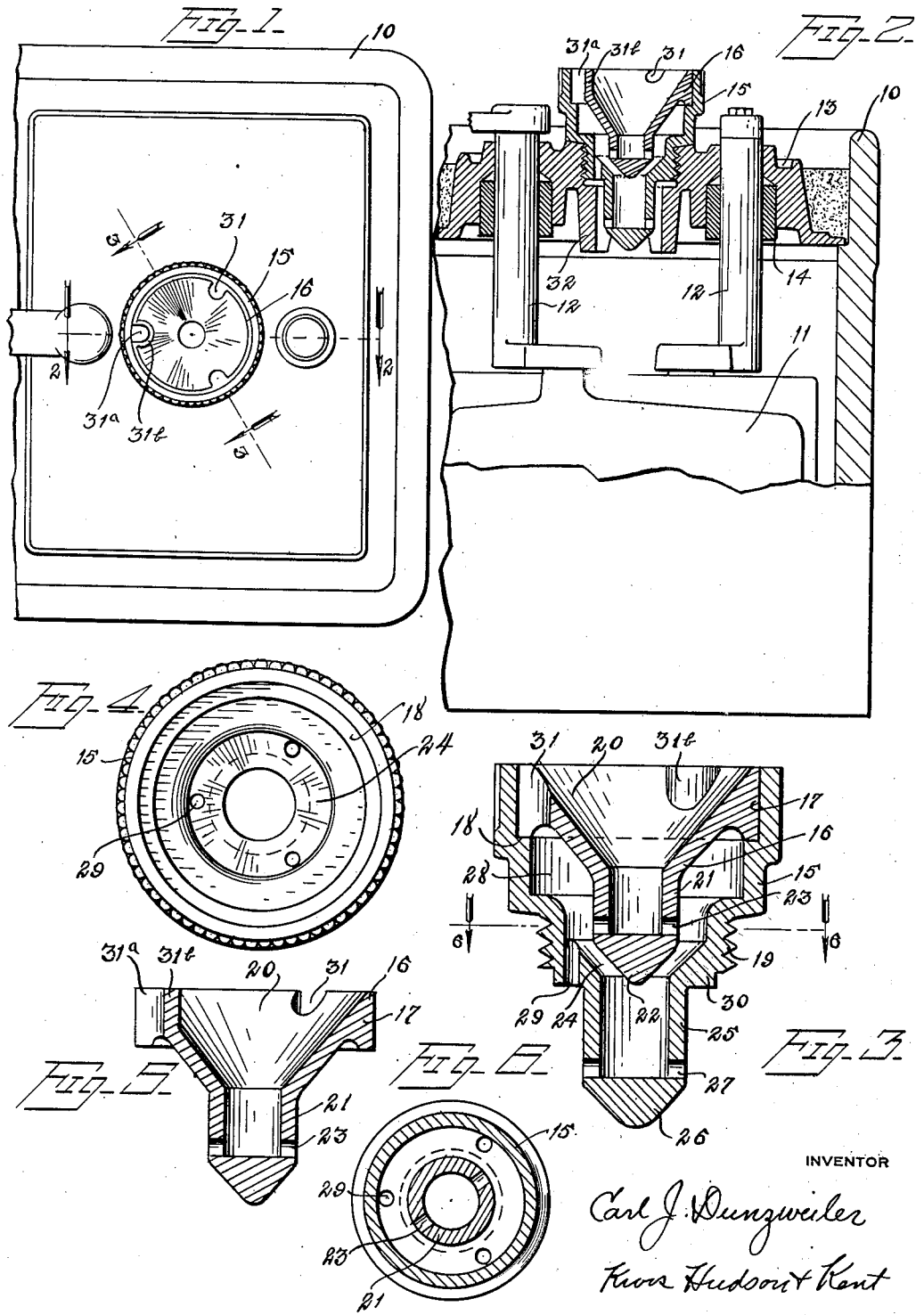
INVENTOR
Carl J. Dunzweiler
ATTORNEYS Patented Feb. 21, 1933

1,898,718

UNITED STATES PATENT OFFICE

CARL J. DUNZWEILER, OF CLEVELAND, OHIO, ASSIGNOR TO WILLARD STORAGE BATTERY COMPANY, OF CLEVELAND, OHIO, A CORPORATION OF WEST VIRGINIA

VENT PLUG FOR STORAGE BATTERIES

Application filed August 15, 1928. Serial No. 299,776.

This invention relates to vent plugs for storage batteries and has for its chief object to provide a vent plug which permits rapid filling of the battery and which reduces to a minimum the amount of electrolyte carried to the top of the battery cell by gas bubbles.

Further, the invention aims to provide a vent plug of the funnel type wherein provision is made for the escape of gas though the funnel is filled to the top in adding water to the cell.

The invention may be briefly summarized as consisting in certain novel details of construction and combinations and arrangements of parts which will be described in the specification and set forth in the appended claims.

In the accompanying sheet of drawing, wherein I have illustrated the preferred construction of my improved vent plug, Fig. 1 is a top plan view of a portion of a battery showing the vent plug in plan; Fig. 2 is a vertical sectional view of the same, the section being taken substantially along the line 2—2 of Fig. 1; Fig. 3 is a vertical sectional view of the plug removed from the cell cover, the section being taken substantially along the line 3—3 of Fig. 1; Fig. 4 is a top plan view of the outer funnel member of the plug, with the inner funnel member removed; Fig. 5 is a vertical sectional view of the inner funnel member of the plug removed from the outer funnel member; and Fig. 6 is a transverse sectional view substantially along the line 6—6 of Fig. 3.

The batteries to which my improved vent plugs are attached may have any number of cells, it being understood that a vent plug such as herein described is provided for each cell. Furthermore, the construction of the battery, aside from the vent plug, is in general immaterial.

In this instance, I have illustrated one cell only of the battery, which includes a jar or casing 10 which is generally of the multi-compartment type, formed of suitable acid-resistant material, such as rubber, bituminous composition, glass or the like. My invention lends itself very effectively to storage batteries having glass jars or containers inasmuch as the transparent wall admits of the rapid filling of any cell in the battery since the electrolyte level can be observed through the wall while the water is being rapidly poured into the vent plug.

The battery element in the cell is designated as a whole by the reference character 11, this element having, as usual, positive and negative posts 12 which extend up through the cover 13, which is generally formed of rubber and is fitted into the top of the cell compartment of the jar 10, and is sealed in place in the usual manner. The posts 12 may be sealed in the cover in any desired manner, sealing sleeves 14 being here shown.

At the center of the cover between the posts, I provide my improved vent plug which is preferably of the double funnel type, as most clearly shown in Figs. 2 and 3, this vent plug having an outer member 15 and an inner member 16, both generally of funnel shape. For convenience of manufacture, the two members 15 and 16 are formed separately, but in the plug assembly as used, the two members are fitted tightly together so as to in effect constitute a single piece, the top of the inner member having a flanged or somewhat thickened portion 17 which is substantially cylindrical in shape fitted into the annular top portion of the outer member, an internal annular shoulder 18 being provided which serves as a stop to support or limit the inward movement of the inner funnel 16. The two parts of the plug are formed of suitable acid-resistant material, preferably rubber.

The outer member is provided about midway of the top and bottom thereof with an externally threaded portion 19 engaging a threaded opening formed in the cover so that the vent plug will project both above and below the cover, as illustrated in Fig. 2.

The inner member 16 has a wide mouthed, funnel-shaped filling opening 20 at the bottom of which is a substantially cylindrical extension 21 terminating in a closed, pointed end 22 which is located somewhat near the middle of the plug. At the bottom of the cylindrical portion 21 and immediately above the pointed end 22, openings 23 are provided for the passage of water to the inner funnel member when the cell is being filled.

The outer funnel member 15 is provided around the pointed end 22 of the inner funnel member 16 with a tapered wall 24 beneath which is a cylindrical extension 25 which terminates in a closed, pointed end 26. Immediately above the end 26 are openings 27 through which the water passing from the inner funnel member into the hollow cylindrical extension 25 passes into the battery.

With this construction there is formed between the lower depending part of the inner funnel member 16 and the surrounding wall of the outer funnel member 15 a chamber 28 which may be aptly termed a condensing chamber for the gas bubbles tending to pass out through the plug. The main inlet to this chamber for the gas bubbles is formed by a series of vertically disposed openings 29 which extend up through a shouldered portion 30 of the outer funnel member 15 at the top of the cylindrical extension 25, the upper ends of these openings being at the top of the tapered portion 24. The gas bubbles enter the chamber 28 principally through the openings 29 and are broken in this chamber, the electrolyte brought up by the bubbles draining back into the cell principally by way of the openings 27, while the gas is permitted to escape through a series of openings 31 at the top of the plug, these openings being preferably formed in the outer wall of the flanged or thickened top portion 17 of the inner funnel member 16. The upper ends of these openings 31 are preferably at the very top of the funnel 20 and at least one of them, designated 31ª, is carried upwardly by a guard wall 31ᵇ to the extreme top of the funnel 20 or of the plug as a whole so that the escape of gas is not prevented even though the funnel 20 is filled with water to its very top.

In practice, water is poured into the upper funnel 20 and drains down through the openings 23 into the outer funnel member and passes by way of the openings 27 near the bottom thereof into the cell. At the same time gas may pass upwardly into the condensing chamber 28 by way of the openings 29 and may escape from the top of the plug by way of openings 31 or by way of the opening 31ª alone for such a time as the funnel is entirely filled with water. In other words, the filling of the cell with water and the escape of gas take place through the plug more or less independently and without either affecting the other. That is to say, the filling operation does not prevent the escape of gas nor can pressure build up in the cell and prevent the entrance of water in filling the cell even though the water is poured into the funnel rapidly enough to completely fill it. This in practice has been found to be a very important feature, as rapid filling of the cells is highly desirable in plants where the battery equipment involves a very large number of cells, as for example in plants of large telephone systems. By providing large water capacity at the top of the plug, the attendant need pay little attention to the rate at which water is poured into the funnel and determines the amount of water which is supplied by watching the rise of the electrolyte level through the transparent wall of the jar when the jar is formed of transparent material. It might be stated that the capacity of the outlet openings 23 is such that, regardless of the rate at which water is poured into the mouth of the filling funnel, the lower part of the plug will not fill up to the gas inlet openings 29. It will be understood also that the number and size of the openings 31, 23, 27 and 29 may be varied as desired to obtain the best results in filling and venting.

In addition to the advantages above enumerated, practice has demonstrated the fact that the gas bubbles are broken in the condensing chamber 28 and that very little if any electrolyte is carried to the top of the battery. I find that the breaking of the gas bubbles short of the top of the plug is enhanced by providing around the lower extension 25 of the outer funnel member 15 a flange 32 provided on the under side of the cover. While this flange is preferably employed, I do not regard it as essential to the effectiveness of this improved plug.

Having thus described my invention, I claim:

1. A combined vent and filler plug for storage batteries comprising a hollow outer element, and a hollow inner element telescoping into said outer element so as to provide a chamber intermediate said elements, said inner element having a passage therethrough with a funnel-shaped portion adjacent the upper end thereof, said outer element being formed with an enlarged upper end and a reduced lower end and a portion intermediate said ends adapted for engagement in the cover opening of a storage battery, said outer element also being provided with a plurality of passages extending through the wall thereof and communicating with said chamber, one of said passages being in said reduced lower end and another in said intermediate portion, and one of said elements being provided with a vent passage at the top thereof leading to atmosphere from the upper portion of said chamber, said vent passage extending through the enlarged open end of the outer element and by-passing the funnel-shaped passage in said inner element.

2. A combined vent and filler plug for storage batteries comprising an outer element having a portion intermediate its ends for engagement in the cover opening of a battery, and an inner element telescoping into said outer element so as to provide a chamber between said elements, said inner element having a passage therethrough with a funnel-shaped portion adjacent the upper end thereof, one of said elements being provided with a passage leading to atmosphere from the top of said chamber, said passage extending through the enlarged open end of the outer element and by-passing said last mentioned passage, and each of said elements being provided with a passage located at the lower end thereof and communicating with said chamber, and said outer element being also provided intermediate its ends with a passage extending through the wall thereof and affording communication between the interior of said battery and said chamber.

3. In a combined vent and filling plug for storage batteries, a pair of cooperating elements adapted to fit together so as to provide a chamber therebetween, one of said elements having a funnel-shaped cavity open at the upper end thereof, and having adjacent the lower end of said cavity a passage communicating with said chamber, the other of said elements having a plurality of passages extending through the wall thereof and adapted to connect said chamber with the interior of a battery cell, one of said passages being positioned adjacent the lower end of said member, the other of said passages being positioned intermediate the top and bottom of said chamber, one of said members being provided with a vent passage leading from the upper portion of said chamber, and means to prevent communication between said vent passage and the funnel-shaped cavity.

In testimony whereof, I hereunto affix my signature.

CARL J. DUNZWEILER.